(12) United States Patent
Johnson

(10) Patent No.: US 7,483,896 B2
(45) Date of Patent: Jan. 27, 2009

(54) ARCHITECTURE FOR COMPUTER-IMPLEMENTED AUTHENTICATION AND AUTHORIZATION

(75) Inventor: Richard C. Johnson, Poquott, NY (US)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 11/145,736

(22) Filed: Jun. 6, 2005

(65) Prior Publication Data

US 2006/0277341 A1    Dec. 7, 2006

(51) Int. Cl.
*G06F 17/30* (2006.01)
(52) U.S. Cl. .................. 707/9; 707/1; 707/6; 707/100; 707/101; 709/1; 710/200; 715/512; 715/513
(58) Field of Classification Search .................. None
See application file for complete search history.

(56) References Cited

U.S. PATENT DOCUMENTS

| | | | |
|---|---|---|---|
| 5,787,427 | A | 7/1998 | Benantar et al. |
| 6,023,765 | A * | 2/2000 | Kuhn .............................. 726/4 |
| 6,044,367 | A | 3/2000 | Wolff |
| 6,202,066 | B1 | 3/2001 | Barkley et al. |
| 6,205,466 | B1 | 3/2001 | Karp et al. |
| 6,233,576 | B1 | 5/2001 | Lewis |
| 6,236,996 | B1 * | 5/2001 | Bapat et al. ..................... 707/9 |

(Continued)

FOREIGN PATENT DOCUMENTS

EP    0860763 A1    2/1998

OTHER PUBLICATIONS

International Search Reported dated May 15, 2007, in corresponding International Application No. PCT/US06/17148, filed May 3, 2006.
Written Opinion dated May 15, 2007, in corresponding International Application No. PCT/US06/17148, filed May 3, 2006.

*Primary Examiner*—Khanh B Pham
*Assistant Examiner*—Andalib F Lodhi
(74) *Attorney, Agent, or Firm*—Young Law Firm, P.C.

(57) ABSTRACT

A computer-implemented method for controlling user access to secured data resources includes a step of inventorying data resources that are to be secured. Thereafter, a requirements data structure may be generated that includes one element mapped to each of the inventoried data resources, each element being configured to store a requirement value that is set according to an authorization level necessary to access the mapped data resource. For each user to have access to any of the inventoried data resources, a grant data structure may be defined that includes one element mapped to each of the plurality of data resources, each element being configured to store a grant value that is set according to an authorization granted to the user to access the mapped data resource. When a user request for access to at least one of the secured data resources is received, a step may be carried out to compare the grant and requirements data structures. Access may then be disallowed by the received user request to any secured data resource that is mapped to any element of the requirements data structure whose requirement value is greater than the grant value of a corresponding element of the grant data structure. In the comparing step, the grant and requirements data structures may be truncated to include only elements mapped to inventoried data resources to which the user request requests access.

25 Claims, 5 Drawing Sheets

U.S. PATENT DOCUMENTS

| | | |
|---|---|---|
| 6,412,070 B1 | 6/2002 | Van Dyke et al. |
| 6,470,450 B1 | 10/2002 | Langford et al. |
| 6,473,800 B1 | 10/2002 | Jerger et al. |
| 6,516,315 B1 | 2/2003 | Gupta |
| 6,839,735 B2 | 1/2005 | Wong et al. |
| 6,941,472 B2 | 9/2005 | Moriconi et al. |
| 2002/0116454 A1* | 8/2002 | Dyla et al. .................. 709/203 |
| 2002/0184521 A1 | 12/2002 | Lucovaky et al. |
| 2003/0074456 A1 | 4/2003 | Yeung et al. |
| 2003/0149884 A1 | 8/2003 | Hernendez et al. |
| 2003/0167269 A1 | 9/2003 | Gupta |
| 2004/0010603 A1 | 1/2004 | Foster et al. |

\* cited by examiner

ARCHITECTURE FOR COMPUTER-IMPLEMENTED AUTHENTICATION AND AUTHORIZATION

BACKGROUND OF THE INVENTION

1. Field of the Invention

The present invention pertains to computer-implemented methods and systems for controlling access and authorization rights with respect to enterprise data, applications and other objects across users' authorization levels.

2. Description of the Related Art

Oftentimes, controlling users' rights to access enterprise data and/or other electronic resources (data and programs with diverse privileges and access rights, including all subdivisions) relies entirely on user authentication (verifying the user's identity to insure that the person or mechanism is who or what he, she or it purports to be). There are several means of securing authentication, including passwords, smart cards, certificates, and even biometric measurements such as retinal scans or voice recognition. Of these, the use of certificates and digital signatures, smart cards, and biometrics are referred to as "strong" levels of security, while the ordinary password-protected access is deemed "weak" by typical financial institutions and security experts. Although current authentication protocols are robust and allow for little or no ambiguity, authentication alone is not sufficient to define and enforce the rights that individuals may have with respect to such resources. In contrast, authorization is not handled sufficiently well to keep applications from frequently contradicting one other or working at cross purposes as to a given user's authorization with respect to a company's security protocol for given data or other program resources.

Moreover, users' authorization levels are not static. Often, such authorization levels change as a result of promotions, demotions, suspensions or terminations or a result of an employee's "need to know" while working on a specific project. Authentication and authorization are not only important within the context of authorizing payments or making contracts that act to bind the company. Indeed, the more mundane day-to-day access to data, programs and other electronic resources should follow a user's role and hierarchical position within the company. That is, companies often want to limit access to selected data resources to a predetermined user or to a predetermined class of users. For example, users that may have a legitimate need to access data concerning their assigned product line or clients may have no such legitimate need to access data relating to product lines and/or customers that are outside of their sphere of responsibility. Moreover, even properly authenticated users that may have a legitimate need to access particular data resources may have a legitimate interest only in viewing the data, but may not have a commensurate legitimate interest to enter new data or to change existing data. Finally, individual users may very well have characteristics, such as either a long tenure with the company or a short one, which would lead the company's security protocol to require different authorization levels. A very important example of this is security clearance, which may not be inferred from other authorization element values.

What are needed, therefore, are methods and systems for insuring strong authorization. In particular, what are needed are methods and systems to insure that those who seek to access such electronic resources are, in fact, authorized to originate such actions and to access such resources and that such access is appropriate, according to the company's security protocols. What are also needed are methods and systems for strong and quantifiable authorization that are operable in a distributed networked computing environment.

SUMMARY OF THE INVENTION

According to an embodiment thereof, the present invention is a computer-implemented method for controlling access to secured data resources. The method may include steps of inventorying the data resources that are to be secured; generating a requirements data structure that includes one element mapped to each of the inventoried data resources, each element being configured to store a requirement value that is set according to an authorization level necessary to access the mapped data resource; defining and storing, for each user to have access to any of the inventoried data resources, a grant data structure that includes one element mapped to each of the plurality of data resources, each element being configured to store a grant value that is set according to an authorization granted to the user to access the mapped data resource; receiving a user request for access to at least one of the secured data resources, and comparing the grant and requirements data structures and disallowing access by the received user request to any secured data resource that is mapped to any element of the requirements data structure whose requirement value is greater than the grant value of a corresponding element of the grant data structure.

The comparing step may include a step of truncating the grant and requirements data structures to include only elements mapped to inventoried data resources to which the user request requests access. The method may include a step of allowing access by the received user request to any secured data resource that is mapped to any element of the requirements data structure whose request value is less than or equal to the grant value of a corresponding element of the grant data structure. The receiving step may be carried out with the user request including a database query. The disallowing access step may include steps of disallowing compilation and execution of the database query. The receiving step may be carried out with the user request including a SQL query. The defining and generating steps may be carried out with the grant and requirements data structures including a user identification field configured to store a value that uniquely identifies a user. The comparing step may include a step of retrieving a grant data structure that includes a user identification field whose value matches the value of the user identification field in the generated requirements data structure. The comparing step may include a step of disallowing execution of the received user request unless a grant binary number collectively formed by the values of the grant data structure elements is greater than a request binary number collectively formed by the values of the requirements data structure elements. A step may be carried out to determine which elements of the requirements data structure have values that are less than corresponding elements of the grant data structure. The determining step may include a step of carrying out an XOR operation on the values of the elements of the requirements data structure and values of corresponding elements of the grant data structure. A logging step may also be carried out to log each instance of disallowed access to any data structure. A step may also be carried out to generate a message to request greater authorization when access to the secured data resources is disallowed. The method may also include a step of updating a value of a selected element in the grant data structure when the message to request greater authorization is answered with a grant of greater authority relative to the selected element. The secured data resources may include at least one of data structures and applications. The defining and storing steps may be carried out by expressing the grant data structure in Directory Services Markup Language (DSML) form and by entering the grant data structure as user data in a digital certificate of the user.

The present invention, according to another embodiment thereof, is a computer system including a database that stores a plurality of secured data resources to which user access is to be controlled. The computer system may include at least one processor; a plurality of processes spawned by said at least one processor, the processes including processing logic for: inventorying the data resources that are to be secured; generating a requirements data structure that includes one element mapped to each of the inventoried data resources, each element being configured to store a requirement value that is set according to an authorization level necessary to access the mapped data resource; defining and storing, for each user to have access to any of the inventoried data resources, a grant data structure that includes one element mapped to each of the plurality of data resources, each element being configured to store a grant value that is set according to an authorization granted to the user to access the mapped data resource; receiving a user request for access to at least one of the secured data resources, and comparing the grant and requirements data structures and disallowing access by the received user request to any secured data resource that is mapped to any element of the requirements data structure whose requirement value is greater than the grant value of a corresponding element of the grant data structure.

The present invention may also be viewed as a machine-readable medium having data stored thereon representing sequences of instructions which, when executed by a computing device, causes the computing device to control user access to a plurality of secured data resources by carrying out steps including: inventorying the data resources that are to be secured; generating a requirements data structure that includes one element mapped to each of the inventoried data resources, each element being configured to store a requirement value that is set according to an authorization level necessary to access the mapped data resource; defining and storing, for each user to have access to any of the inventoried data resources, a grant data structure that includes one element mapped to each of the plurality of data resources, each element being configured to store a grant value that is set according to an authorization granted to the user to access the mapped data resource; receiving a user request for access to at least one of the secured data resources, and comparing the grant and requirements data structures and disallowing access by the received user request to any secured data resource that is mapped to any element of the requirements data structure whose requirement value is greater than the grant value of a corresponding element of the grant data structure.

According to another embodiment thereof, the present invention is a computer-implemented method for controlling user access to data resources of an enterprise. Such a method may include steps of inventorying data resources to be secured; for each inventoried data resource, assigning a requirement value that defines an authorization level that is required to access the data resource; storing the requirement value for each inventoried data resource in a requirements data structure; for each user to have access to any of the inventoried data resources, defining a grant data structure that includes a grant value for each of the inventoried data resources, each grant value determining whether the user is allowed access to a corresponding secured data resource, and when a request for access to one of the inventoried data resources is received from a user, comparing the requirements data structure to the user's grant data structure and allowing the request for access to execute only when the grant value for the data resource to which access is requested is at least as great as the corresponding requirement value.

The method may also include a step of enabling selected users to define and assign delegated grant data structures to hierarchically lower users in the enterprise, the defined and assigned delegated grant data structures storing grant values that are no greater than the grant values of the grant data structure of the user that defined and assigned the delegated grant data structures. The enabling step may be carried out such that each grant value of each user's grant data structure is no greater than corresponding grant values of grant data structures assigned to hierarchically higher users. The method may further include a step of granting a user's request for an increased authorization level to access a selected data resource and correspondingly increasing a grant value for the selected data resource in the grant data structure of the user having made the request. A step of canceling a user's grant data structure when the user leaves the enterprise may also be carried out. The grant values of the grant data structure for each user may initially be defaulted to a lowest value that is indicative of a lowest possible authorization level and the grant data structure values for each element may be manually, optionally, or automatically reset at events (such as promotion) designated by managers or indicated by corporate security protocols.

DESCRIPTION OF THE INVENTION

Figure 1:
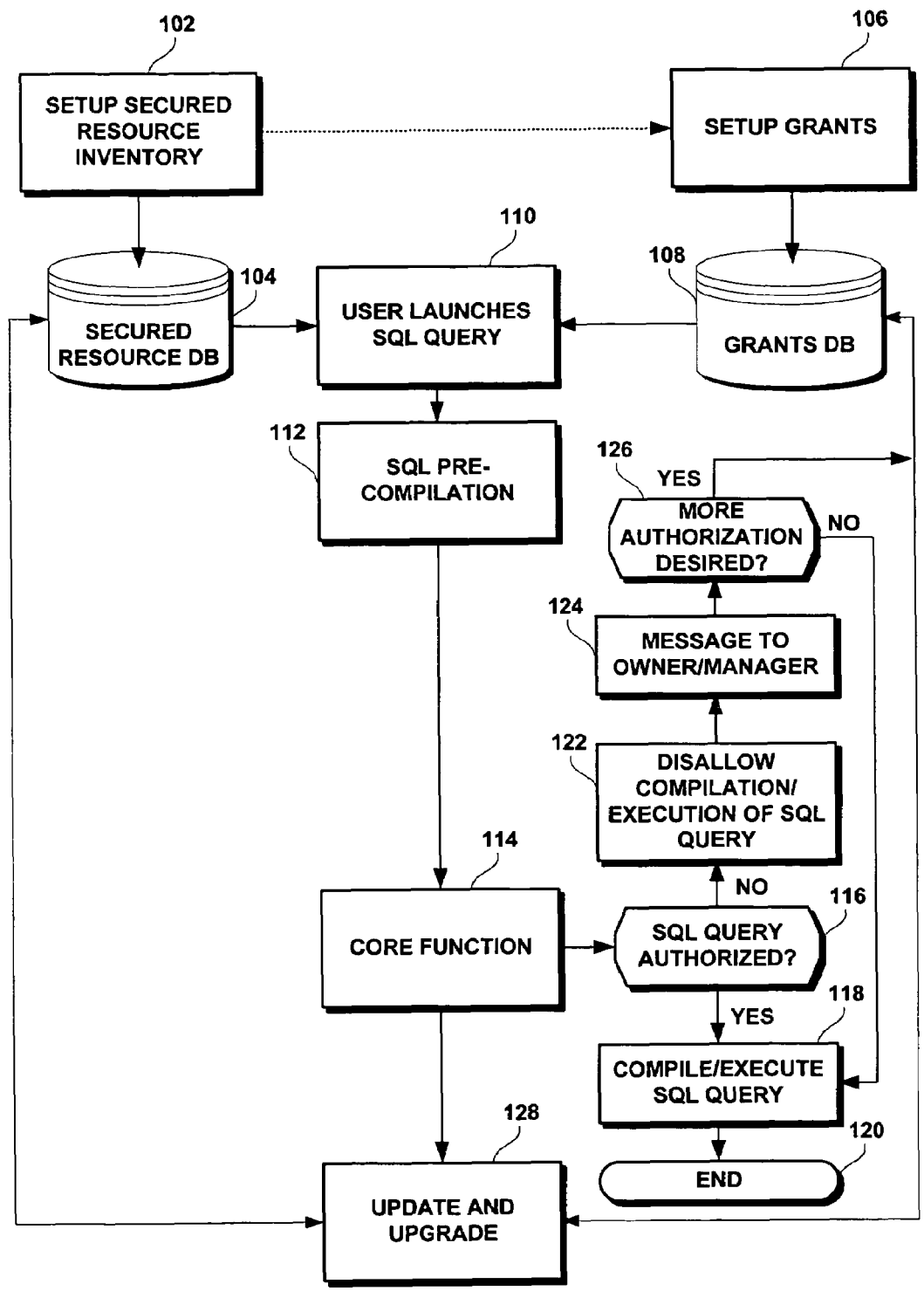
FIG. 1 is a flowchart of aspects of the computer-implemented method for controlling access to secured data resources, according to an embodiment of the present invention.

Embodiments of the present computer implemented methods for defining, securing and controlling access to secured data resources may include five modules: the Setup Resource Inventory module, the Setup Grants module, the SQL Compilation module, the Core Function module, and the Upgrade and Update module. These modules span the functionality described below from setting up and populating the various databases to enabling or preventing users from executing SQL (or other structured) queries on or other requests for access to the secured data resources, depending on whether they have been authenticated and duly authorized to do so.

According to embodiments of the present invention, when a user is denied access or other privilege with respect to a secured data resource or programs, such denial is interpreted as being caused by the user having been granted insufficient rights or authority to access the secured data resource that is the target of his or her SQL query or other request for access to the data resources. According to embodiments of the present invention, when a user's query is prevented from executing because of insufficient rights relative to the secured data resources sought to be accessed by the SQL query, the user may be given the opportunity to send a message to his or her manager. Such a message (such as an email, for example, or other form of electronic message) may be formatted automatically and may indicate the specific requested access privilege(s), the user's current level(s) of access privilege now held with respect to the secured data resource to which access is sought, and the access privilege level(s) required for satisfaction of the user's SQL query. A message may also be generated automatically and independently of the user to alert his or her manager or some designated (preferably hierarchically-higher) person in the organization of the attempted access to the secured data resource. According to embodiments of the present invention, all user-attempted actions with respect to the relational database management systems (RDBMS) are understood to be SQL or like-structured statements. Any statement or function in any programming language or shell/other script may be stored in an (e.g., Oracle Corporation) RDBMS and its use securely controlled.

Thereafter, if the manager has sufficient access privilege, the manager may delegate or grant the requested additional access privilege and the user may be given the opportunity to retry the query, this time with an expectation of success. According to embodiments of the present invention, users can only delegate or grant access privileges that are equal to or inferior to the set of privileges granted to them. In this manner, no user may grant or delegate secured data resource access privileges that are greater than the access privileges currently assigned to them. According to the present invention, a user may cause a query to execute only when the user is found to have access privileges equal to or greater than those required to perform the indicated query.

The following will detail architectures, methods and systems suitable to establish control over data resources and control access thereto. The phrase 'secured data resource', as used herein, is intended to encompass all data, databases, files, programs, applications, and other items to be controlled as to access, execution, and other privileges through SQL (for example) commands. The Setup Resource Inventory, the Setup Grants, the SQL Compilation, the Core Function, and the Upgrade and Update modules are described below in the rough order of their execution.

Setup Resource Inventory

Figure 4:
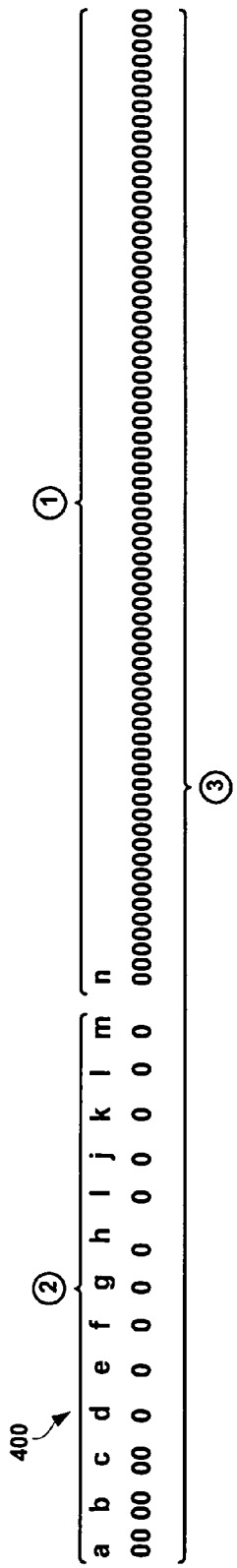
FIG. 4 shows an exemplary Security Data Structure on which the GSDS and RSDS data structures may be based, according to the 'Worked Example' below and according to an embodiment of the present invention.

The Setup Resource Inventory module 102 may be configured to register all secured data resources and to store the levels of access privilege that are required to access the inventoried secured data resources. The registrations of the secured data resources as well as the respective levels of access privilege (or authority, as the two terms are used interchangeably herein) may be stored in a secured data resource database, as shown at 104 in FIG. 1. Once generated, the inventory may be used as a framework from which a Security Data Structure (SDS) may be attached. An exemplary SDS is shown in FIG. 4 at reference numeral 400.

According to embodiments of the present invention, each user desiring access to secured data resources may be issued a unique identification number of, for example, 64 bits. As shown, the SDS 400 may include (1) a dummy element to hold the USER_ID 412 of an authenticated user. This dummy element may occupy the least significant places in the SDS 400. The SDS 400 may also include (2) as many elements in the SDS 400 as may be required to map to a company's security protocols (including one element for each secured data resource subject to secure authorization), and (3) as many bits, nibbles, or bytes as may be needed to represent the value stored in each SDS element. Each of the elements 402 of the SDS 400 may be identified with an element identifier (a-n in the example shown in FIG. 4). For example, the access privilege needed to access element e in the SDS 400 may be represented and stored by a single bit. For example, an authenticated user either has sufficient access privileges to access the secured data resource corresponding to element e, or the user does not. Therefore, the size 406 of element e may be 1 bit, which is sufficient to represent the two values 406 thereof; namely, authorization (e=1) or non-authorization (e=0). The SDS 400 may also include a legible description of each element, as shown at 404. In this example, if the value of the element is "0", the user is not authorized to access the secured data resource mapped to element e. Contrary wise, if the value of the element is "1", the authenticated user is indeed authorized to access the secured data resource mapped to element e. According to embodiments of the present invention, if the user is determined to have access privileges for element e that are at least as great as the access privilege needed to access element e, the user may access the secured data resource corresponding to element e. If the user is determined not to have access privileges for element e that are at least as great as the access privilege needed to access element e, the user may not access (or is not authorized to access) the secured data resource corresponding to element e. That is, a SQL query that seeks to access the secured data resource corresponding to element e will only be allowed to compile and execute if the user's access privileges for that element are at least as great as those stored in the secured resource database 104 for that element. The user's access privilege must meet the access requirements for each query or the user's query will be denied execution. This allows a very fine control over access to the secured data resources.

As there may be a very large number of secured data resources, the SDS 400 may be configured to include a correspondingly large number of elements, the access privileges to which may be stored in one or more bits per element. Note that elements may be of widely different sizes. The access privileges stored in such an SDS 400 may be defined by the deploying company's Human Resources (HR) department, for example. These access privileges reflect what HR managers know about individual employees and both the rules and values specified by HR. HR also is the usual custodian of fundamental corporate rules concerning contractors, contractors' employees, subcontractors, partners, partner employees, suppliers, supplier's employees and all who may require legitimate access to a carefully controlled subset of the enterprise's secured data resources. All such persons may require access privileges to one or more of the inventoried secured data resources, and all need to be accorded basic access privileges to corporate secured data resources from HR or any appropriate party having sufficient access privileges, as one cannot grant greater privileges than one currently possesses.

For example, the HR and/or Legal departments may determine the status of any authenticated individual and the access privileges to the secured data resources that stem from that status. Then, the managers responsible for each authenticated individual may devolve a subset of their own access privileges onto those who report to them once HR has passed on their status as employee, contractor, or other.

HR may also have an interest in securing its own data. Managers of resources will determine access privileges and assign inventory elements and values to effect their portion of the overall corporate security model, whether directly or through an extended approval process.

The access privilege or authority may be defined according to a Security Clearance level (e.g., Limited Distribution=1, Secret=2, Top Secret=3, Executive Eyes Only=4), for example. However, in each instance, the binary number that stores the access privilege for each element should represent the rank order of the access privileges such that a higher (for example) number represents a higher order of privilege, linked or mapped to a secured data resource denoted by the element. It is to be noted that many secured data resources may be accessed by many different applications, the access privileges recommended or specified by these applications or by different managers may differ. Therefore, it is important that the access privileges for such a secured data resource that may be accessed across a plurality of applications be set at the highest level required by any one of the plurality of applications, to prevent user from application-shopping to find access to a predetermined secured data resource using lesser access privileges than would otherwise be required. The present application described here incorporates that principle.

Where feasible, rules are executed here so that the product of the rule may be expressed as a binary number in a named and assigned element 402. Where that is not feasible, all required information needed by the rule must be available when the user issues a SQL command such that the SQL Compiler may generate an appropriate binary number to put into the element in question.

At this point, the Setup Resource Inventory module 102 has acquired the required levels of access privilege for each of the several elements corresponding to each of the several secured data elements that are to be access-controlled, and that for each user to have access to the secured data resources. The Oracle Registration Facility (ORF), available from the present assignee, may (but need not) be used as a tool by the data resource owners to attach elements and values to the specific secured data resources to be secured in the secured resource database 104. The SDS, along with the dummy user ID element, may be represented as a binary or bit string with a known structure of different sizes of elements, as shown at 400 in FIG. 4. The USER_ID may also be appended to all SDS structures, such as to the GSDS and the RSDS (discussed below) included.

The question of just how many bits may be handled in an SDS bit string is at least partially set forth in the IA-32 Intel Architecture Software Developer's Manual Volume 2A: Instruction Set Reference A-M. Therein, pages 3-7 read "Bit (BitBase, BitOffset) . . . returns the value of a bit within a bit string, which is a sequence of bits in memory or a register . . . . If BitBase is a memory address, BitOffset can range from −2 GBits to +2 GBits." In short, a bit string or several bit strings may take up to the available free memory. The programmer may declare an array of integers to secure the necessary memory and then initialize the SDS structure as appropriate. Setting individual bits, given the format of the SDS structure 300, is not a difficult proposition, and the Grant equivalent (the GSDS, discussed herein under) will allow the same access to memory. The size of 2 GBits should be understood as the maximum likely size of an unsigned bit string, even though it should be feasible to use as much of the memory as is available at the time of execution.

The size available of 2 GBits is sufficiently large that it would hold a flattened total of 2,000,000,000 elements of one bit each, or 2×1000×1000×1000. However one allocates this amount of memory, 250 megabytes, each structure would only occupy a fraction of the memory available on even modestly powerful desktop computers. Moreover, the memory allocated for the SDS structures and the comparison operation (also discussed herein under) may readily be released as soon as the result of the comparison has been processed. This same reasoning on the maximum extent of the bit strings applies also to the Grant structure (GSDS) described below. Note also that the mechanisms described below may include a shortened subset of the full SDS: a Resource SDS (hereinafter RSDS) may be configured to contain bit values for each of the elements corresponding to all of the secured data resources or may be configured to contain only the resources requested by the user in a SQL query and discovered by the compiler function to be secured will actually be evaluated, which is a more economical proposition in terms of memory usage.

Setup Grants

Now that each data resource to be controlled has been inventoried and assigned a position and a value within the SDS structure, access rights to those inventoried secured data resources may be selectively granted to users. Returning now to FIG. 1, the Setup Grants module 106 is concerned with processing the list of persons to have access and operational privileges or authority relative to the secured data resources inventoried by module 102 and stored in the secured resource database 104. In the Setup Grants module 106, the RSDS structure of the form shown in exemplary FIG. 4 is duplicated and the values of its constituent elements 302 defaulted to zero. The reason for this is to set the default value of the access grants as low as possible, compared to the default requirements for access, which are preferably as high as possible. In this manner, before access grants and operations privileges are set, the Grant SDS or GSDS is set at a default 0 whereas the requirement for access grants and operations privileges for each element is set to its maximum. These values may then be changed according to the desired access level for each element and the level of access to be granted to each user to access the secured data resources. The GSDS structure representing access privilege has the same data structure and elements (but not element values, necessarily), which allows the RSDS and GSDS to be readily compared to one another to determine whether a particular authenticated user will be granted access to a particular secured data resource.

The Setup Grants module 106 may be configured to collect and/or to receive the basic information on employees from HR as to employment status, hierarchical standing and rights relative to the secured data resources. The Setup Grants module 106 may be configured to generate a GSDS for each person to have access to any of the secured data resources. The GSDS for each person to have such access has the same structure as shown in FIG. 4, and the bit-values of the various elements appropriately set according to the person's access rights. Each person's GSDS will include that person's USER_ID in the least significant portion of the GSDS structure.

To set such access privileges, the HR department (for example) may grant privileges to the resources it controls, and it may also enter security rules according to its rights. The next step may be for each manager of persons to have access to any of the secured data resources (all employees have such a manager, except perhaps for the CEO) to grant specific levels of privilege for each person that reports to him or her, optionally subject to an approval step from the manager's manager, security officials at the company, HR, or any vetting agent the company chooses. This feature is intended to allow review of privilege assignment as the deploying company sees fit.

The use of models or templates can make this assignment of access rights very rapid for individuals receiving grants from their managers. Such models or templates may be used by managers to assign a given set of rights (a subset of the rights they possess) to the secured data resources to his or her reports. At the end of this process, all employees or other authenticated individuals to have any level of access to the secured data resources will have been assigned specific levels of privilege on each of the GSDS elements consistent with their position in the company and/or consistent with their sphere of responsibility within the company. Company policy may determine whether $2^{nd}$ level managers need to approve some or all grants from the first level manager. The value of elements that are not relevant to an individual are defaulted at 0, meaning no access. In this manner, each person's GSDS enables the employee to access only those secured data resources that are required to do the employee's job or contracted task. Similar integrated control is also available for contractors and their employees and partners and their employees, as well as vendors and customers and their employees who are to have access to any of the enterprise's secured data resources.

The end result of all managers using this module as a tool for granting privileges will be the GSDS structure, with all of the appropriate elements assigned a value indicating the level of privilege for a specific authenticated party. The authenticated party's GSDS may be expressed in Directory Services Markup Language (DSML) form and entered as user data in the authenticated party's certificate. The GSDS DSML may be stored in a database of (for example) Oracle's Application Server, and it may be stored in an Oracle Security Server.

In this manner, the deploying company may fully specify the access rights of all authenticated parties to have any access to any of the company's secured data resources and may store these access rights in a separate GSDS for each such party. This allows an individual's GSDS to be compared with the resource security requirements expressed in the RSDS. In each case, the manager who is the putative resource owner (with approval of other corporate parties as required by a company's policies and procedures) should nominate certificate-bearing persons for a user ID and for a GSDS of their own. The next module describes the functional reaction to a user's SQL query after the user logs in with a (e.g., Public Key Infrastructure or PKI) certificate. The certificate number (including, e.g., the USER_ID) may now loaded into the least significant position in both the RSDS and GSDS.

Note also that additions to inventory (i.e., the addition of secured data resources to be accessed-controlled) to the secured resource database 104 may require returning to the Setup Resource Inventory module 102 to register the secured data resource in the secured resource database 104. Also required would be the modification of the user's or users' GSDS to add an element corresponding to the newly added secured data resource. The Setup Grants module 106 may then be invoked to suitably set the bit values of the element(s) corresponding to the newly added secured data resource for each user's GSDS. During normal use (e.g., users formulating SQL queries against secured data resources, as shown at 110 in FIG. 1), the Setup Resource Inventory module 102 and the Setup Grants module 106 may not be used (although the Grants database 108 may be used). Again, any user's default privilege respecting any new addition to secured inventory defaults at zero or no access.

SQL Pre-Compilation

The functions of the Pre-compiler Module 112 include the parsing and scanning of the user's requested query or session-specific set of queries or requests for access, and selecting out the secured resources required for execution of the query and building the RSDS for the query or queries. Note that the element bit-values in the RSDS will always be defaulted to the highest number consistent with the size of the element, while the default user grant is zero. Hence, the default bit value corresponding to an element identifier having a size of two bits will be "11" and the default bit value corresponding to an element identifier having a size of one bit will be "1". This will lock out anyone not having the highest available privilege if an element is not assigned a specific numerical bit value through happenstance or for any other reason.

An important functionality of the Pre-compiler Module 112 is (1) the linking of a specific SQL secured data resource invocation from the cumulative queries in a session with the element identifier and the bit value corresponding to the element identifier that characterizes the security authorization level for that secured data resource (and any of its security-significant subsets or associated rules), (2) the writing of specific bit values into the RSDS structure such that the Core Function Module 114 (described below) may properly test the authorization privileges of the authenticated user against the user's own GSDS structure, and (3) where overlapping and unequal security claims are made from several sources, to always favor and enforce the highest value required from any authorization source for a given bit value corresponding to any element identifier. The third item (3) item is the key protection against the current problem of unequal protection for the same information by different applications.

At the end of the pre-compilation process, there is a data structure SDS of n+1 dimensions (elements) containing one or more bits, where the data structure SDS with n elements has an appended, low order binary number representing the authenticated user ID. The default value is set at the highest number reachable by the size of the ID element, and the user ID may be placed into this element by an authenticated login. The elements, all but the user ID, may be sorted in the order of their numerical value; this means that the most significant numbers as derived from assignment of elements to resources and values to access levels may be disposed to the left and the least significant numbers to the right.

SQL Pre-compilation, with its processing of late decided rule values for reserved elements, must not only assign the result of applying the rule as a value of the reserved element, but it must also re-sort the elements in the inventory security SDS (leaving the user ID in least significant position). As can be seen below, in Setup Grants, there will be a matching set of elements that must have the same sort order as those originating in attaching security values to inventory resources. To distinguish these two SDS instances, they will be named Resource Security Data Structure (RSDS) and Grant Security Data Structure (GSDS), respectively. The default value of RSDS for the User_ID is the highest value available in the size allotted. The default value of GSDS for the User_ID is set to 0. Thus, absent an authenticated login, the Core Operations described below must always fail.

The core function module 114 is responsible for determining whether the user's privileges are sufficient to allow the user's direct or indirect SQL query to go forward and compile and execute. Current operating principles call for range, open, or blind query to return any information to which the user holds sufficient privilege. Embodiments of the present invention may continue this principle, but may feature optional messages should a user make a direct request for a secured resource without the requisite level of privilege or authority. Embodiments of the present invention may also check to see whether the user is guessing at the existence of secured information for which the user does not hold sufficient privilege. For example, a certain number of failed specific resource references within a session may generate messages to the user, to the user's manager, and/or to the owner of the resources subject to failed access attempts. These messages from may be configurable and should follow currently implemented security policies regarding unauthorized access to data.

The Efficiency of Pre-compilation

Embodiments of the present invention may include two Pre-compilers. The Pre-compiler 112 may be run first and a second Pre-compiler may then be run to convert embedded or ad hoc SQL statements. Many customers at present tolerate a degradation of performance in exchange for increased security. However, embodiments of the present invention may enhance rather than degrade performance for given sets of queries. Indeed, selection of only those queries that are authorized (stripping out non-authorized statements or statement segments) may send a substantially smaller query to the compiler. Moreover, stored Pre-compiler results may allow (1) even more rapid determination of authorized portions of a SQL statement and (2) even an alternative to the Pre-compiler function for iterated queries within a period of time or within a session.

Conversion of the general "where *" SQL clause to a specific set of requested "where" items may also substantially reduced the scope and execution time of a given query. It is much faster to process a closed set of items than a range or generalized global category, which inevitably must be searched and processed among the database tables to assemble such information. The pre-compiler module 112 according to an embodiment of the present invention may pass on a revised query containing only the items on which a test of privilege must be made; the Core function 114 strips any parts of the query where the privilege is insufficient, and the Compiler may only have to compile a reduced query.

According to an embodiment of the present invention, all queries should be pre-compiled at 112 to prepare a test of authorization for the requested query or queries and its several parts; the alternative is to either forego any of the savings of efficiency afforded by embodiments of the present invention (e.g., compile everything and wait for other low level security measures to frustrate a result at further cost to performance, for example) or settle for diminished or contradictory security protocol and enforcement scheme. A further option is to optimize security and limit performance. Of course, one could also gain performance by eliminating security. However, embodiments of the present invention allow one to have both performance and authorization security, mapping well to the understandable goal of customers to bend specific application security provisions to fit their institutional security protocols.

According to embodiments of the present invention, every report generated, every bit of information retrieved, every edit or update, every occasion to invoke data and operation security is preferably expressed as an SQL (for example) query in the database. Forms and templates, data collection pages, other graphical user interfaces and like structures may have SQL statements embedded therein. Developers and others who have programmatic access to company resources may also be controlled with regard to authorization security. In some cases, enhancements for non-SQL compilers or for execution environment tools may be needed.

SQL pre-compilers exist at present to convert embedded SQL statements into statements that can be handled by a compiler in one of the supported programming languages. Such pre-compilers, may be used herein to parse and scan an incoming SQL query, and to recognize the secured data resources to which access is sought and to retrieve the associated elements and element values from the RSDS database, in which the authorization levels needed for access to such secured data resources are coded. These materials may then be assembled in the RSDS structure. The RSDS structure may then be replicated with the corresponding individual user's GSDS structure, with the same elements in the same order. The GSDS structure and the RSDS structure may then be ready at this point to pass on to the Core Function process shown at 114 in FIG. 2.

If the user's query fails because the user's GSDS did not specify sufficiently great authorization for the secured data resource sought to be accessed, the user should not gain access thereto. Blind queries or non-specific queries involving ranges, for example, may readily be detected and thwarted. If found, notifications of failed queries may be sent to the user's manager. However, such notifications should only be sent to managers that have sufficient privileges with respect to the secured object to which access was attempted through the user's attempted SQL query. If not, the failures may be sent as a notice to the secured object owner, who then may decide whether to contact the user's manager and/or (possibly) to grant privileges to the manager. Guessing at the names of unauthorized variables, marked by repeated failures in the same session, is a violation of most company security policies and the user's manager may be notified by an appropriate message. The owners of such secured resources may define a number of trials, after which the system may interpret such repeated access attempts as a violation of security policy. The notice of a guessing violation need not require disclosure of the secured data resource's existence to any manager not holding appropriate privilege—namely; a privilege that is sufficiently high as to access the secured data resource.

An important function of the SQL Pre-compiler 112 is to receive input as to resource security requirements from users' query requests and to translate such input into a connection between a given SQL statement and the relevant secured data resources utilized in executing that statement. According to embodiments of the present invention, the pre-compilation of the query as a whole may then lead to setting the bits required in each of several element values of the user's RSDS to reflect the security values of the query. Thus, depending on the query, the number of RSDS elements whose respective values are set is variable. In any case, the SQL Pre-compiler 112 acts as a security gatekeeper, inasmuch as it sets the appropriate bits within the user's RSDS structure for the attempted query to pose a challenge that the user's own GSDS must meet. The end result is heading off unauthorized users at the pass, before they get anywhere close to the secured data resources.

The SQL Pre-compilation process may first set all GSDS elements to equal the value in the user's GSDS structured store of privileges. This may be done so that users may never be seen to have any other than their assigned privileges. The unused, un-requested resources will not block a given user's access to otherwise authorized secured data resources if the user's query does not cite these resources. Alternatively, therefore, the RSDS and GSDS structures may be truncated to just those elements that are relevant to the current session queries.

The SQL Pre-compiler 112 may also advantageously store a set of names of the specific privileges at issue in this particular session and its queries so that these names may be inserted into messages that may be generated at the conclusion of the operation of the Core Function 114 detailed below.

Queries may be stored locally along with the RSDS element value updated as determined by the SQL Pre-compiler 112. The expectation is that over time, within and between sessions, a user's iterated queries may be retrieved from such local storage instead of being computed at each instance.

Core Functions

According to embodiments of the present invention, the Core Functions may be executed by the Core Function module 114 to compare the user's RSDS generated for the query that the user wants to execute with the user's GSDS, which sets the user's previously granted authorizations with respect to the secured data resource. The Core Functions may compare the user's RSDS generated for the submitted query with the user's own previously generated GSDS. Such a comparison, according to an embodiment of the present invention, may be carried out as follows:

1. It is determined whether GSDS≧RSDS;
2. The RESULT is 1 or 0 (a logical TRUE or a logical FALSE);
3. If RESULT is TRUE, the User has previously been granted sufficient authorization to enable his or her query to execute and the query may be allowed to compile and to execute.
4. If the RESULT is FALSE; that is, if GSDS<RSDS, the bitwise operation GSDS XOR RSDS yields a unique number that is indicative of the elements of RSDS that are greater than the corresponding elements in GSDS and the user's query is prevented from executing (at least with respect to any operation that would access the secured data resources to which the user has insufficient authority);
5. The unique number output of #4 above yields a combination of element identifiers that failed authorization.
6. Embodiments of the present invention may be configured to disallow the query seeking to access the secured data resources for which the user has insufficient authorization and/or to request a GRANT of sufficient authority from the Setup Grants module 106. Messages may also be generated, to alert (for example) the owner of the secured resource to access was unsuccessfully attempted. Blind, range, or a predetermined number of iterated guesses may also cause the generation and sending of one or more messages to the resource owner (and the user's manager if the user's manager has the privilege) for the first two and the last may be considered a violation of company security policy and cause a message to be generated and sent to the resource owner and/or a designated security person (configuration item).
7. If the user chooses to request a GRANT of sufficient authority to complete the failed query (or independently of the user), the method may revert to the process outlined relative to the Setup Grants module 106.
8. If the authorization is granted, the user's authorized, stored, and linked query may then be stripped of unauthorized portions and the authorized query executed and the secured data resources referenced by the query accessed. The user may only learn directly of authorization failures from specific citation of resources in the query unless otherwise configured. Alternatively, the system may be set to strip the unauthorized elements and their corresponding resources from the query, proceeding to compile and execute only the authorized portions of the query.

Relative to numbers 4 and 5 above, the unique number may be derived as follows. Given a result of FALSE on the >= test, at least one of the elements being tested must have failed. That is, in at least one instance an element must have had greater requirements (RSDS side) than privilege (GSDS side). Once the elements are sorted and aligned for both GSDS and RSDS, any failure of an element must mean that the RSDS has at least 1 most significant bit set in each of its failed elements. Note that the XOR result of 0 in GSDS and 1 in RSDS is 1 for equivalent elements, while 0 in GSDS and 0 in RSDS will XOR out as 0 for corresponding elements. This is the "exclusive or" XOR mechanism of either one but not both. If there is a difference, it must be that the 1 in the most significant position within the failed element will be a result if the element has failed the >= test.

Since the elements are ordered and are all known, n elements must have a combination of failures as follows:

For example, if n=5, there are 5 different elements, each of which or all of which could fail. The combinations (order is not significant in element failure) are:

$A = 5!/1!(5-1)!$ for a single element failing, (this is 5)
$B = 5!/2!(5-2)!$ for two elements failing (this is 10)
$C = 5!/3!(5-3)!$ for three elements failing (this is 10)
$D = 5!/4!(5-4)!$ for four elements failing, and (this is 5)
$E = 5!/5!(5-5)!$ for 5 elements failing. (this is 1)

The implication is that, for n=5, an indexed array of 31 possible cells would hold all the different combination of failed elements for a set of 5 such elements. The number represented by each combination of failed elements would be some number between 1 and 31 (note that 0 means no failure and so is not part of the array). An array of A+B+C+D+E would hold all of the possible combinations of failure, which array may be generated any time that the ordered elements of GSDS are known. Then, the array may be indexed such that each failed element may be inferred from the unique number generated by XORing GSDS and RSDS. Therefore, an index into the array containing the failed element(s) may be derived from the unique number resulting from the XOR core operation.

The result is that setup of the CORE function may include generating the array of failed element combinations to be accessed by means of the unique number resulting from XOR'ing the RSDS and the GSDS. The CORE function, passing on the information about which elements were approved and which were disallowed, may allow the user's submitted query or queries to execute on just those resources to which the user had sufficient granted rights.

The message utility knows the user's user ID and has access to the information it needs as to the user's manager. The message finally may ask the user: do you wish me to forward this message to your manager so that the manager may grant you sufficient rights to execute your query? The user may then reformulate the query or request the necessary privilege. The manager, even if in possession of sufficient granting privilege, may or may not choose to check approved on the message; there also may be a provision for other approval workflow on this message. The end result of implemented embodiments of the present invention is that the company is afforded a ready means of dealing with its security requirements in a systematic, robust, and performing manner.

The case where the user has sought a range of values, some authorized and some not, may (A) be converted by the compiler to a request for all of the indicated authorized items, (B) be the occasion for a message to be sent to the manager at the user's request for additional privilege, (C) result in a request for additional privileges, approved by the manager, and sent to the owner of the resource in question, or (D) some combination of these, to be determined by the configuration selected by the authorized user setting up the system.

The case where the user repeatedly tries different variables, none of which is authorized for the user or even exists, is a violation of at least some security rules. This practice is similar to guessing a password through repeated trials. Embodiments of the present invention may be configured to send messages as determined appropriate in the customer company's security policies.

Update and Upgrade

UPGRADE and UPDATE modules may be provided to both transfer existing security provisions to appropriate RSDS structures and to allow further modification at the user's option. Similarly, the existing rules in applications and outside may be processed so that RSDS elements will be generated. Then, automatic processing of user profiles should allow the equivalent elements of GSDS to hold appropriate values. From this point, the user will have a fully functioning system with the security characteristics of the existing database system. The user may then proceed to flesh out the existing security parameters with any desired additional granularity. This module may provide appropriate forms to collect information required in this process. The module will also provide forms and automated procedures to process promotions and other changes in status of system Users which affect any or all of their job duties, employment or contracted status, or their need to know particular information (and hence their authorization).

Figure 2:
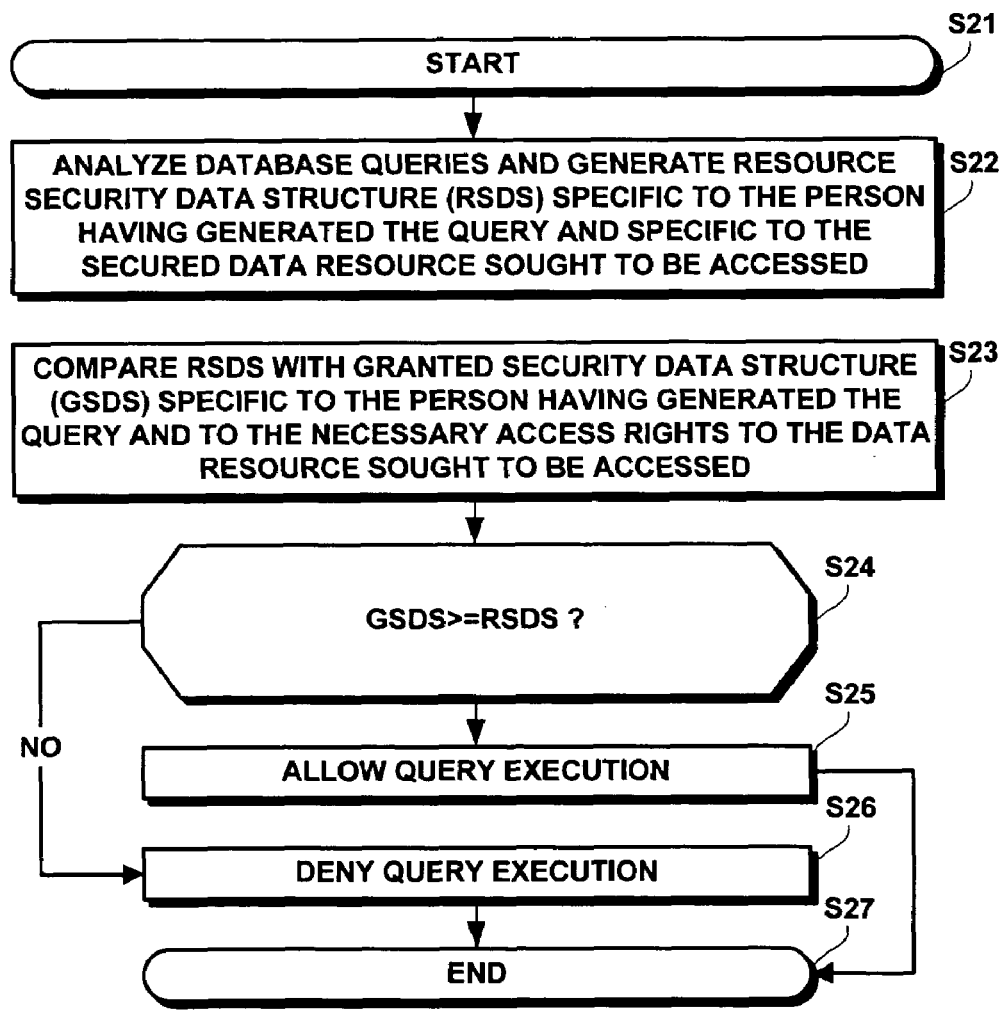
FIG. 2 is a flowchart showing steps that may be carried out to allow query execution or to deny query execution, according to embodiments of the present invention.

FIG. 2 is a flowchart showing steps that may be carried out to allow query execution or to disallow query execution, according to embodiments of the present invention. FIG. 2 assumes that there is already a GSDS structure stored for the user. The GSDS structure codifies the user's authorizations with respect to the secured data resources. Unsecured data resources are, by definition, unrestricted with respect to access thereto, at least by duly authenticated personnel. Operationally, the methods begins at S21, whereupon as queries are formulated and submitted for execution, the queries are analyzed and an RSDS structure is generated specific to the person having submitted the query and specific to the secured data resources sought to be accessed by the submitted query or queries, as called for in step S22. By comparing the GSDS and the RSDS specific to the user and to his or her query, as shown at S23, a determination may be made relative to the user's authority to access the secured data resources referenced by the submitted query. For example, if GSDS is greater or equal to RSDS, the submitted query may be allowed to execute, as shown at S24 and S25. If the (value of the) GSDS is smaller than the (value of the) RSDS, the user's query may be disallowed (e.g., prevented from executing), as shown at S26. The method may end at S27. In case of failure, additional steps (such as an XOR operation, for example) may be carried out to determine exactly which elements in the RSDS were set to a lesser value than their counterpart elements in the user's GSDS. To reduce the size of the GSDS and RSDS structures, they may be selectively truncated and/or masked as necessary.

Figure 3:
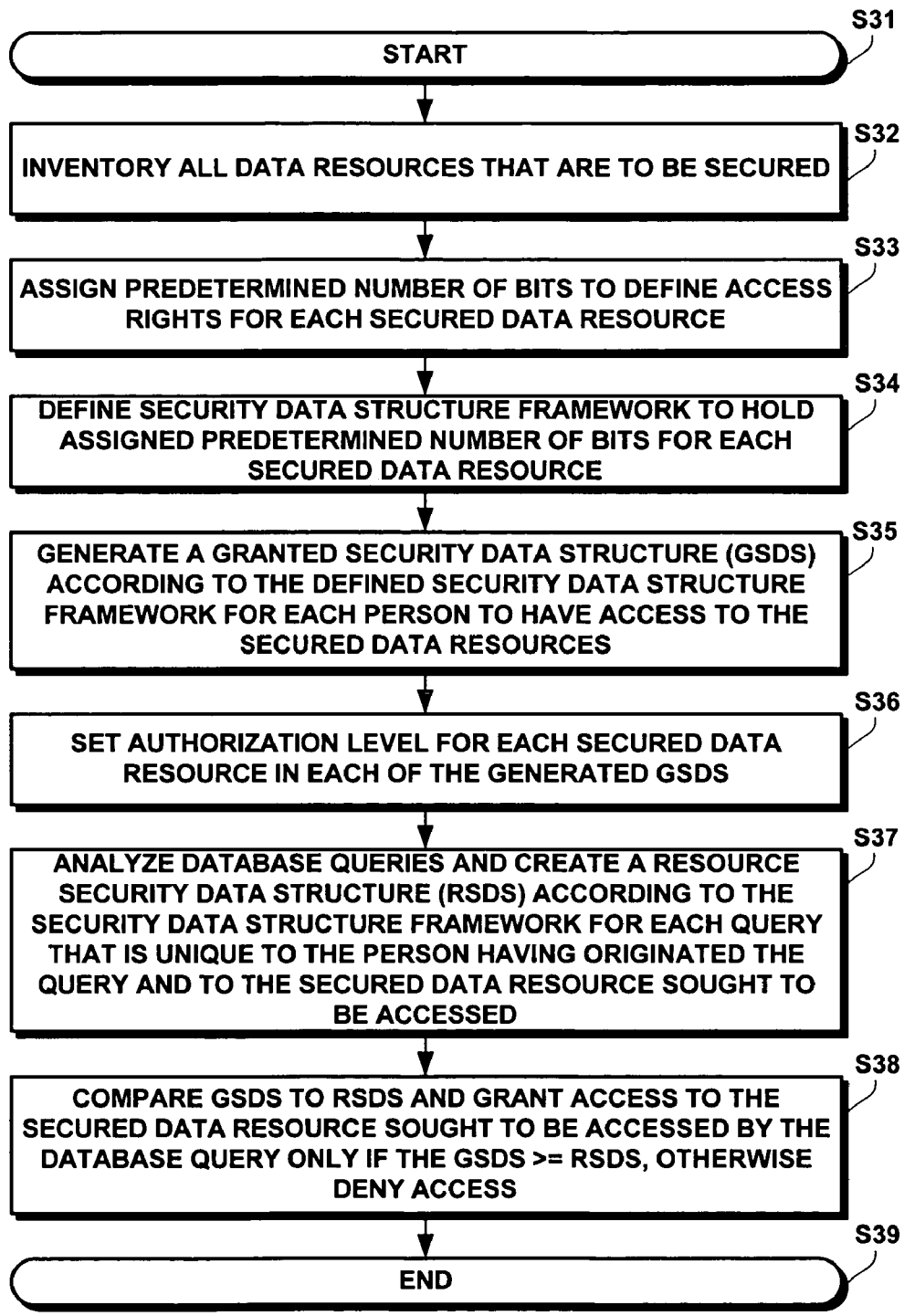
FIG. 3 shows additional and expanded steps that may be carried out to control access to secured data resources, according to embodiments of the present invention.

FIG. 3 shows expanded steps that may be carried out to control access to secured data resources, according to other embodiments of the present invention. The method shown in FIG. 3 starts at S31, whereupon an inventory of all data resources that are to be secured may be carried out, as shown at S32. Thereafter as shown at S32, a predetermined number of bits may be assigned to each inventoried data resource to be secured to define their respective access rights. A single bit may be sufficient in cases wherein authorization to access is either granted or not, with more bits enabling a finer grained control (e.g., read only, read/modify, delete, etc.). A security data structure (SDS) framework may then be defined to hold these bits, an example of which is shown in FIG. 4. Steps S35 and S36 call for one such SDS structure to be defined for each user that may request access to the secured data resources, and their respective granted authorities coded by selectively setting the bits corresponding to their authority level on each element of the structure, to form the GSDS structure for that user. As shown at S37, when queries that reference or otherwise seek to access secured data resources are received, a RSDS structure is generated for the user that submitted the query or queries, which RSDS has the same structure as the user's GSDS. However, the RSDS contains bit values for each constituent element mapped to secured data resources that the user's query seeks to access, and the values stored in each such element may or may not be less than their counterpart in the user's GSDS. When the GSDS and RSDS structures (or matching subsets, as determined by specific queries) are compared to determine whether to allow execution of the submitted query, it may be determined whether GSDS>=RSDS. If so, the user's query is allowed to execute. If GSDS<RSDS, then the user has submitted a query for which his authorization is insufficient and his or her query is (at least initially) denied execution, as called for by step S38. Further operations (such as an XOR operation, for example) may be carried out to determine exactly which element(s) of the query failed (i.e., for which the RSDS element was greater than the corresponding GSDS element). Additional steps (not shown in FIG. 3) may then be carried out for security purposes, such as logging of the failed attempt to access secured data resources and/or messaging steps to alert managers and/or request the grant of sufficient authority to enable the query to successfully execute.

Worked Example

The following presents an example of the above-described methods for computer-implemented authorization. The example to follow shows business processes and the manner in which the security methods described herein affect the components of such business processes. For purposes of illustration only, this example features a fictional X Company (hereafter, XCO) having three departments; namely, the ENTRADA department, the FUNDUS department and the GORGON department. XCO also features two hierarchical levels; namely, the Entry Clerk hierarchical level and the Invoice Approver hierarchical level, and one centralized payment department FUNDUS. This example includes five users, of which three are Invoice Clerks (JONES, SMITH, and BROWN) and two are Manager/Invoice Approvers (DITHERS and SMITHERS). In this example, these five users will deal with two product families; namely, the GIZMO product family and the GADGET product family. Conventionally, each department would be organized as a separate Operating Unit (OU) with consequent security provisions. According to embodiments of the present invention, however, such OUs need not have any significance except as they may be used in user-defined rules and/or as the basis for assigning privileges, rights, and roles to users.

Authorization Security Rules Applied in This Example

All payments are to be made from the FUNDUS department, XCO's centralized payment department.

JONES can enter invoices for the ENTRADA department only. However, JONES can also see invoices of the FUNDUS department.

SMITH can enter invoices for the FUNDUS department only.

BROWN can enter invoices for departments ENTRADA and GORGON.

DITHERS can see invoices of departments ENTRADA, FUNDUS, and GORGON; DITHERS may also approve/update these invoices for payment.

DITHERS can see, create and update payments in the FUNDUS department (regardless of product family).

SMITHERS can see GADGET Product Family invoices of the ENTRADA, FUNDUS, and GORGON departments. SMITHERS may update these invoices (invoice payment method) and approve them to be submitted to payment run if they contain only items from the GADGET Product family. SMITHERS may not approve payments for the GIZMO product family.

SMITHERS may see and update payments in the FUNDUS department, and may approve payment for invoices originating from the ENTRADA and FUNDUS departments only.

DITHERS can audit (see), and approve (update) for payment, any invoices that have been entered for the GIZMO product family only.

Therefore, both Invoice Clerks and Managers/Invoice Approvers have only limited authority to update, approve, and even audit or see records. The above-defined rules for XCO's Accounts Payable and Accounts Receivable set the requirements for accessing and updating financial records by Product Family (either GADGET or GIZMO) or for approving payment for invoices from XCO's three departments (ENTRADA, FUNDUS and GORGON). Note that invoices containing both GADGET and GIZMO line items would be barred to those with only an audit privilege for the GADGET product family, or only the GIZMO family, unless it were possible to see partial invoices.

DITHERS will be able to see invoices received for items of Product Family GIZMO simply enough as in the Setup Resource Inventory and Setup Grants stages, where first the owner of GIZMO sets the requirement privilege in an appropriate element of RSDS and then, in the Setup Grants stage, the owner of GIZMO makes a grant of privilege and the corresponding element is set at the appropriate privilege level. The owner of the resources of the GIZMO Product Family would protect all GIZMO resources he/she wished, establishing appropriate elements in the GSDS. Then, that owner could grant DITHERS (and, by delegation and within HR guidelines, DITHERS could grant privileges to his/her reports). This means that DITHERS would not have access to invoices for items of the GADGET Product Family unless these accesses were to be granted by the GADGET owner or by a holder of sufficient GADGET privilege.

DITHERS would also lack access, without the needed grant of authority, to invoices having mixed invoice lines (e.g. the first invoice line for an item of Product Family GIZMO and the second invoice line for an item of the GADGET Product Family).

The following details how these security provisions may be implemented by an embodiment of the present invention. The Human Resources (HR) department (for example) may be the entity within XCO that is given the responsibility to determine which employees have access to the company's books and other secured data resources. Therefore, for the three departments, only SMITH, JONES, and BROWN (Invoice Clerks) as well as DITHERS and SMITHERS (Managers/Invoice Approvers) should have any privileges at all in the financial application maintained by XCO. Moreover, at least one of these five must be a logged-in and authenticated user. The Invoice Clerks are constrained by their need to do their jobs and their need to know; these two are the basis of the privileges that are assigned to them by their managers.

All XCO secured data resources may be registered in a database, such as shown at 104 in FIG. 1. According to embodiments of the present invention, the secured data resources include all data, programs, or electronic records belonging to XCO to which access is to be controlled. Therefore, an inventory of all such data resources should be carried out and the results of the inventory registered in a registration database. It is from this registration database that a Resource Security Data Structure (RSDS) may be created for each person to have access to such secured data resources. An RSDS database may be created to store these RSDS structures.

The RSDS, in this manner, defines authorization levels that must be met for the uniquely identified person to which the RSDS is assigned to gain any access, view or ability to edit or approve the inventoried secured data resources to which his or her query seeks access. The owners of the secured data resources will respond to the prompts from Setup Secured Resource Inventory Module 102 in a manner that will lead to the selective setting of the RSDS bits corresponding to the constituent elements thereof according to the desired level of access to grant to the uniquely identified user, for each element. Using alphabetical element identifiers for each of the elements in the TSDS structure, one might obtain:

|  | A | b | c | d | e | f | g | h | I | j | k | l | m | n (User_ID) |
|---|---|---|---|---|---|---|---|---|---|---|---|---|---|---|
| Initial RSDS | 11 | 11 | 11 | 1 | 1 | 1 | 1 | 1 | 1 | 1 | 1 | 1 | 1 | 88888888 |
| Post Setup RSDS | 0 | 0 | 0 | 0 | 0 | 0 | 0 | 0 | 0 | 0 | 0 | 0 | 0 | 88888888 |

Note that the initial RSDS structure (i.e., the initial state of the RSDS before any bit values corresponding to the desired level of access are set) has the bit values of the element identifiers a, b, c . . . m set to their maximum value of 11 (11 is binary for 3). In this example, and as shown in FIG. 3, elements a, b, c have three levels of authorization rights associated therewith, corresponding to the bit values 00 (No Access), 01 (See/Audit) and 10 (Enter). Note also the User_ID 8888888 is used to denote a 64 bit string (for example) for the User_ID, which uniquely identifies the user. The elements are also in the sort order of their maximum value, excepting only the User_ID at the least significant position.

Setup Grants

The Grant Security Data Structure (GSDS) is a mirror image of the RSDS structure; its initial element bit values are set to 0, the default privilege.

|                | a | b | c | d | e | f | g | h | I | j | k | l | m | n |
|---|---|---|---|---|---|---|---|---|---|---|---|---|---|---|
| Initial GSDS   | 0 | 0 | 0 | 0 | 0 | 0 | 0 | 0 | 0 | 0 | 0 | 0 | 0 | 88888888 |
| Post Setup GSDS| 0 | 0 | 0 | 0 | 0 | 0 | 0 | 0 | 0 | 0 | 0 | 0 | 0 | 88888888 |

The implication is that the default for each user is no privilege at all on any secured data resources in the query. Note that the user's query may succeed for any unsecured object. If the user has launched a blind query, the user will see only those objects for which the user actually has the requisite privilege. Embodiments of the present invention disallow access to secured data objects to which the user has not been granted sufficient authorization.

SQL Compilation

Returning now to the specific example developed herein, SMITHERS, with no privilege to see or audit any invoices containing information from the GIZMO product family, decides to check on the GIZMO product family anyhow—he knows the product name from other sources and guesses at the proper WHERE clause. Now, with user SMITHERS logged in and authenticated, SMITHERS launches a series of queries from a financial application configured to access the secured data resources in a single session, such as shown at reference numeral 110 in FIG. 1. The queries contain a request for a report on sales from the GIZMO and GADGET product families and another request for the approval of payment for a specific invoice from the GORGON department containing both GADGET and GIZMO family products. Recall the Authorization Security Rules for this user: SMITHERS can see GADGET Product Family invoices of the ENTRADA, FUNDUS, and GORGON departments. SMITHERS can update these invoices (invoice payment method) and approve them to be submitted to payment run if they contain only items from the GADGET Product family. SMITHERS may not approve payments for the GIZMO product family. Moreover, the Authorization Security Rules also state that SMITHERS can see and update payments in the FUNDUS department, and may approve payment for invoices originating from the ENTRADA and FUNDUS departments only.

The Compiler (or Pre-compiler) Module (shown at 112 in FIG. 1) will infer from SMITHER's query that the relevant secured data resources elements are mapped to element identifiers f (Approval of invoices from the GORGON department), j (GADGET Product Family Audit), k (GIZMO Product Family Audit), l (GADGET Product Family Invoice Approval), and m (GIZMO Product Family Invoice Approval). Setting the bit values of the element identifiers according to the requested access to these secured data resources for SMITHER's queries results in an RSDS whose bit values are as follows:

| a | Invoice Privilege, Entrada | 00 | (0 = No Access 1 = See/Audit 3 = Enter) |
|---|---|---|---|
| b | Invoice Privilege, Fundus | 00 | (0 = No Access 1 = See/Audit 3 = Enter) |
| c | Invoice Privilege, Gorgon | 00 | (0 = No Access 1 = See/Audit 3 = Enter) |
| d | Approve/Update Inv. Payment, Entrada | 0 | (0 = Not Authorized 1 = Authorized) |
| e | Approve/Update Inv. Payment, Fundus | 0 | (0 = Not Authorized 1 = Authorized) |
| f | Approve/Update Inv. Payment, Gorgon | 1 | (0 = Not Authorized 1 = Authorized) |
| g | Audit/See Inv. Payment, Entrada | 0 | (0 = Not Authorized 1 = Authorized) |
| h | Audit/See Inv. Payment, Fundus | 0 | (0 = Not Authorized 1 = Authorized) |
| i | Audit/See Inv. Payment, Gorgon | 0 | (0 = Not Authorized 1 = Authorized) |
| j | GADGET Product Family Audit | 1 | (0 = Not Authorized 1 = Authorized) |
| k | GIZMO Product Family Audit | 1 | (0 = Not Authorized 1 = Authorized) |
| l | GADGET Prod. Family Pymt Approval | 1 | (0 = Not Authorized 1 = Authorized) |
| m | GIZMO Prod. Family Pymt Approval | 1 | (0 = Not Authorized 1 = Authorized) |
| n | Authenticated USER_ID | $8^2$ bits | (64 bit unique SMITHERS ID) |

Therefore, following the structure of the SDS 400 set out in FIG. 4, SMITHER's RSDS may have the following format: 00 00 00 00 1 0 0 0 1 1 1 1, followed by a trailing SMITHER's 64 bit User_ID in the least significant position. Truncating this structure to only include the bit values for those secured data resources that SMITHER's desires to access through his queries will lead to a structure for SMITHER's RSDS for these queries as follows:

| f | j | k | l | m | User_ID |
|---|---|---|---|---|---|
| 1 | 1 | 1 | 1 | 1 | SMITHERS |

As shown, each secured data resource that SMITHERS seeks to access in his queries has its corresponding bit value set to "1". Setting the bit values of the element identifiers according to the authorizations for SMITHERS defined in the Authorization Security Rules above for SMITHERS results in a GSDS for SMITHERS whose bit values are as follows:

| a | Invoice Privilege, Entrada | 00 | (0 = No Access 1 = See/Audit 3 = Enter) |
|---|---|---|---|
| b | Invoice Privilege, Fundus | 00 | (0 = No Access 1 = See/Audit 3 = Enter) |
| c | Invoice Privilege, Gorgon | 00 | (0 = No Access 1 = See/Audit 3 = Enter) |
| d | Approve/Update Inv. Pymt, Entrada | 0 | (0 = Not Authorized 1 = Authorized) |

-continued

| | | | |
|---|---|---|---|
| e | Approve/Update Inv. Payment, Fundus | 0 | (0 = Not Authorized 1 = Authorized) |
| f | Approve/Update Inv. Payment, Gorgon | 1 | (0 = Not Authorized 1 = Authorized) |
| g | Audit/See Inv. Payment, Entrada | 0 | (0 = Not Authorized 1 = Authorized) |
| h | Audit/See Inv. Payment, Fundus | 0 | (0 = Not Authorized 1 = Authorized) |
| i | Audit/See Inv. Payment, Gorgon | 0 | (0 = Not Authorized 1 = Authorized) |
| j | GADGET Product Family Audit | 1 | (0 = Not Authorized 1 = Authorized) |
| k | GIZMO Product Family Audit | 0 | (0 = Not Authorized 1 = Authorized) |
| l | GADGET Prod. Family Pymt Approval | 1 | (0 = Not Authorized 1 = Authorized) |
| m | GIZMO Prod. Family Pymt Approval | 0 | (0 = Not Authorized 1 = Authorized) |
| n | Authenticated USER_ID | $8^2$ bits | (64 bit unique SMITHERS ID) |

Note that the bit values for users' GSDS may be defined in advance of any query by such users. Therefore, following the structure of the SDS 400 set out in FIG. 4, SMITHER's GSDS may have the following format: 00 00 00 0 0 1 0 0 0 1 0 10, followed by a trailing SMITHER's 64 bit User_ID in the least significant position. Truncating this structure to only include the bit values corresponding to the generated RSDS above (so as to include only the bit values for element identifiers f, j, k, l, m and the User_ID) yields the following truncated GSDS for those secured data resources that SMITHER's desires to access through his queries:

| f | j | k | l | m | User_ID |
|---|---|---|---|---|---------|
| 1 | 1 | 0 | 1 | 0 | SMITHERS |

Note that there are only 5 bits are used to define the granted and requested authorization, in addition to the 64 bits used for the User_ID. Although the entire un-truncated bit strings for both the RSDS and RSDS structures may be used, such is not necessary as most queries do not involve or require access to all the inventoried secured data resources. Truncating may advantageously be carried out on both the RSDS and the GSDS, as there is no need to evaluate any GSDS bit values except for those that match the RSDS bit value subset which, in turn, is derived from the user queries.

Core Function

Functionally and with reference to this example, the Core Function Module, shown at 114 in FIG. 1, tests whether SMITHERS will get to see the GIZMO sales report, the GADGET sales report and whether SMITHERS will get to approve the payment for a specific invoice from the GORGON department containing both GADGET and GIZMO family of products. This test may include a comparison of the GSDS and RSDS bit strings. The net result of this comparison may include selectively preventing the execution of any of SMITHER's (for example) SQL queries involving the secured data resources for which SMITHERS does not have proper authorization or allowing such SQL queries to execute. According to an embodiment of the present invention, this comparison may include a first step of determining whether GSDS>=RSDS is TRUE. If so, SMITHERS' query will be allowed to execute. If the result of GSDS>=RSDS is FALSE, an exclusive OR operation (hereafter, XOR) or other test may be carried out, using both the bit-strings of the (optionally truncated) RSDS and GSDS as operands.

Substituting the values for GSDS and RSDS, the GSDS>=RSDS operation becomes 11010 SMITHERS USER_ID>=11111 SMITHERS USER_ID=FALSE. From this, it may be inferred that at least one element of RSDS has a most significant bit that is greater than the corresponding GSDS element. Therefore, to determine which element or elements of the RSDS are greater than the corresponding GSDS element or elements, the Core Function Module 114 may carry out the following XOR operation:

$$\begin{array}{r} 1\ 1\ 1\ 1\ 1\ \text{SMITHERS USER\_ID (RSDS)} \\ \text{XOR}\ \underline{1\ 1\ 0\ 1\ 0\ \text{SMITHERS USER\_ID (GSDS)}} \\ 0\ 0\ 1\ 0\ 1\ 0 \end{array}$$

Therefore, the result of the XOR operation is:

| f | j | k | l | m | User_ID |
|---|---|---|---|---|---------|
| 0 | 0 | 1 | 0 | 1 | 0 |

Ignoring the trailing "0" obtained by XORing the necessarily identical two instances of the SMITHERS User_ID, the value of the result is 00101, which corresponds to a decimal value of 5, which indicates a failed authorization on elements k and m (audit and payment approval for the GIZMO product family). Alternately, a separate XOR operation may be carried out for each element of the RSDS and GSDS structures and any bit that is set in the result may then be stored and associated with its corresponding failed element. Consequently, the Core Function Module 114 will disallow the execution of SMITHERS' attempted access to the secured data resources to which he has not been granted any or sufficient authorization, as shown at 122 in FIG. 1. Specifically, SMITHER'S SQL queries that access the secured data resources mapped to element identifiers k and m will be denied execution. Functionally, this means that SMITHERS will not be able to access secured data resources related to audit and payment approval for the GIZMO product family.

In greater detail, given a non-zero result of the XOR operation between the GSDS and the RSDS, at least one of the elements (f, j, k, l, m) must have failed. That is, in at least one instance, an element must have had greater requirements (RSDS side) than privilege (GSDS side). If there is a difference between the two, a 1 in the most significant position within the failed element will result if that element has failed the XOR test.

Given the result of the XOR operation, there are many methods that may be used to determine which element or elements caused the logical 1, which is indicative of insufficient privilege. For five different elements (f, j, k, l, m) any one or all of these elements could fail. The combinations (order is not significant in element failure) are:

A = 5!/1!(5 − 1)! for a single element failing, (this is 5)
B = 5!/2!(5 − 2)! for two elements failing (this is 10)
C = 5!/3!(5 − 3)! for three elements failing (this is 10)
D = 5!/4!(5 − 4)! for four elements failing, and (this is 5)
E = 5!/5!(5 − 5)! for five elements failing (this is 1, as there is only a single combination 11111 for failing all elements f, j, k, l, m)

The implication is that, an indexed array of 31 possible cells would hold all the different combination of failed elements for a set of 5 such elements. The number represented by each combination of failed elements would be some number between 1 and 31 (note that 0 means no failure and so is not part of the array), just as a 5 digit binary number ranges between 0 and 31.

An array of A+B+C+D+E would hold all of the possible combinations of failure, which array could be generated any time that the ordered elements of GSDS are known. Then, the array could be indexed such that each failure cell (containing information about the set of failed elements) could be inferred from the unique number generated by XORing GSDS and RSDS. Then, the index to the cell of the array containing the failed element designations may be derived from the unique number resulting from the XOR operation.

The result is that setup of the Core Function 114 may include generating the array of failed element combinations to be accessed by means of the number from the result of XOR'ing the RSDS and the GSDS. The Core Function 114, passing on the information about which elements were approved, would allow the Compiler to continue to execute on just those resources to which the user had sufficient granted rights, as shown at 116 and 118 in FIG. 1.

When the Core Function 114 fails (sets a logical 1, for example) for any element, according to an embodiment of the present invention, a message to SMITHERS' manager may be formulated, generated and sent as shown at 122 and 124 in FIG. 1. This message may 1) inform SMITHERS' manager of the attempted access to the secured data resources related to audit and payment of GIZMO product family and/or 2) as shown at 126 in FIG. 1, a request for grant of authorization sufficient to enable him to access GIZMO invoice entries and approve GIZMO payments, through e.g., appropriate SQL queries. For example, DITHERS, the manager who normally handles the GIZMO product family, may be out sick. In that case, if SMITHERS' manager wants the information, he or she may contact the manager of the GIZMO product family and request that the proper authorization to access the GIZMO product family be granted to him or her. SMITHERS' manager, now equipped with the proper authorization, may then grant equal or lesser access rights to SMITHERS, to thereby empower SMITHERS to access the GIZMO product family. Increasing SMITHERS' authorization may be carried out through the functionality of the Upgrade and Update module 128.

Upgrade and Update

To enable SMITHERS to access the secured data resources concerned with audits and invoice approvals for the GIZMO product family, SMITHERS' manager, providing he or she has been granted sufficient authorization with respect to these secured data resources, may utilize the Upgrade function 128 to reset SMITHERS' GSDS structure for the elements f, j, k, l, m from

| f | j | k | l | m | User_ID |
|---|---|---|---|---|---------|
| 1 | 1 | 0 | 1 to | 0 | SMITHERS |
| 1 | 1 | 1 | 1 | 1 | SMITHERS |

Note that the bit values for the k and m element identifiers have been set from a binary "0" to a binary "1", indicating that the user corresponding to the User_ID is authorized to access the secured data resources that are mapped to these element identifiers. In this case, SMITHERS' GSDS now stores a "1" for the element identifier k, which authorizes SMITHERS to audit the GIZMO Product Family and stores a "1" for the element identifier m, authorizing SMITHERS to approve payments for the GIZMO Product Family. SMITHERS' upgraded GSDS may be stored in the Grants database 108. Now, recycling through the process, SMITHERS may then formulate (for example) SQL queries that are configured to access the secured data resources related to the audit and approval for the GIZMO product family, with the expectation that such SQL queries will be allowed to execute. After the SQL Pre-Compilation Module 112 executes, the Core Function Module 114 executes, comparing the SMITHER's updated GSDS with the (preferably truncated) RSDS obtained from SMITHERS' SQL query. This time, the bit values corresponding to the relevant element identifiers in the RSDS structure are exactly equal to the bit values of the corresponding element identifiers in SMITHERS' GSDS. In this case, as SMITHERS' RSDS is equal to his GSDS, it may be determined at 116 to allow SMITHERS' SQL queries for the secured data resources relating to audit and approval of the GIZMO product family. SMITHERS' SQL queries may then be compiled and executed, as shown at 118, whereupon the method ends at 120. Further attempts to execute SQL commands will all be subject to the same comparison between the resulting RSDS and the user's GSDS in the Grants Database 108.

This example assumes that user SMITHERS already knows all of the secured data resources included in his query. Were SMITHERS to use a blind query, a range of values, or a lucky guess, SMITHERS might gain information about objects for which, as a user, SMITHERS has no privilege. Embodiments of the present invention may be configured to detect (in the SQL Pre-compiler module 112, for example) any such blind query, range, or non-specific reference in the query; and compilation and/or execution of any such queries may be disallowed and may cause a message to be sent directly to the (for example) SMITHERS' manager if he or she has appropriate privilege or, if not, to the owner of the secured data resource that SMITHERS has attempted to access. Embodiments of the present invention will expand any range or open query to a collection of elements, and those to which the user has no privilege are barred from access/execution. The elements to pass authorization will be the ones whose corresponding resources figure in the final SQL results allowed. The owner of this secured data resource is then free to grant access privileges to such secured data resources to SMITHERS' manager, and SMITHERS' manager is thereafter free to delegate any privilege held in general and this privilege in particular. It is to be noted that one may delegate only authorizations that are equal to or less than the level of authorization that one currently owns. Otherwise, either SMITHERS or SMITHERS' manager would be in violation of the need to know/need to do your job precept by knowing about objects for which they lacked the privilege.

This leaves the prospect of a lucky guess. GIZMO is an obvious qualifier for the GIZMO product family, and SMITHERS already knows GIZMO exists. But for any instance of mere guessing, repeated trials are likely and such trials may be monitored. According to embodiments of the present invention, repeated failures may constitute a violation of security policy to be reported to SMITHERS' first and second line managers (for example). In no case will embodiments of the present invention permit unauthorized access, even with lucky guesses and repeated trials.

Figure 5:
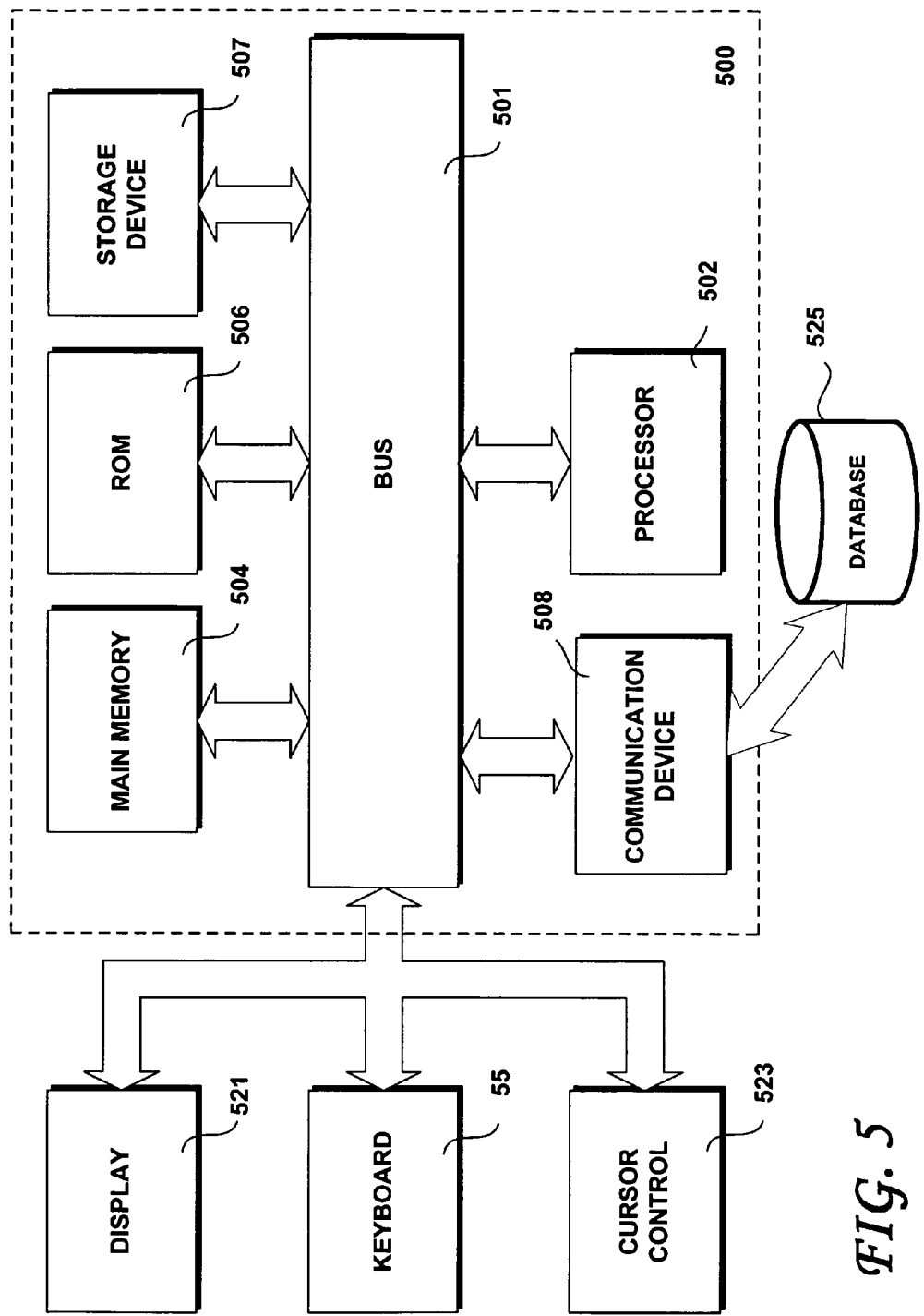
FIG. 5 is a block diagram of an exemplary computer on which embodiments of the present invention may be practiced.

FIG. 5 illustrates a block diagram of a computer system 500 upon which embodiments of the present inventions may be implemented. Computer system 500 includes a bus 501 or other communication mechanism for communicating information, and one or more processors 502 coupled with bus 501 for processing information. Computer system 500 further comprises a random access memory (RAM) or other dynamic storage device 504 (referred to as main memory), coupled to bus 501 for storing information and instructions to be executed by processor(s) 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions. The computer system 500 may also be coupled via the bus 501 to a display device 521 for displaying information to a computer user. An alphanumeric input device 522, including alphanumeric and other keys, is typically coupled to bus 501 for communicating information and command selections to processor(s) 502. Another type of user input device is cursor control 523, such as a mouse, a trackball, or cursor direction keys for communicating direction information and command selections to processor 502 and for controlling cursor movement on display 521. A microphone may be used to provide verbal input, and cameras may be used to input user gestures or sign language, as shown at 525.

Embodiments of the present invention are related to the use of computer system 500 and/or to a plurality of such computer systems to enable the methods and systems for implementing authentication and authorization as described, shown and claimed herein. According to one embodiment, the methods and systems described herein may be provided by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the steps and have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art may recognize other alternative embodiments and all such embodiments are deemed to fall within the scope of the present invention.

What is claimed is:

1. A computer-implemented method for controlling user access to data resources, comprising the steps of:

inventorying the data resources whose access is to be controlled;

generating a requirements data structure that includes a first bit string including a first plurality of elements, each of which being mapped to a separate one of the inventoried data resources and being configured to store a requirement bit value;

setting, for each of the first plurality of elements, the requirement bit value according to an authorization level necessary to access the mapped data resource;

defining and storing, for each user to have access to any of the inventoried data resources, a grant data structure that includes a second bit string including a second plurality of elements, each of which being mapped to a separate one of the inventoried data resources and being configured to store a grant bit value;

setting, for each of the second plurality of elements, the grant bit value according to an authorization granted to the user to access the mapped data resource;

receiving a user request including a SQL query for access to at least one of the secured data resources;

performing a bit-wise comparison of the grant and requirements data structures and disallowing access by the received user request to any secured data resource that is mapped to any element of the requirement data structure whose requirement bit value is greater than the grant bit value of a corresponding element of the grant data structure.

2. The computer-implemented method of claim 1, wherein the bit-wise comparison performing step includes a step of truncating the grant and requirements data structures to include only elements mapped to inventoried data resources to which the user request requests access.

3. The computer-implemented method of claim 1, further including a step of allowing access by the received user request to any secured data resource that is mapped to any element of the requirements data structure whose requirement bit value is less than or equal to the grant bit value of a corresponding element of the grant data structure.

4. The computer-implemented method of claim 1, wherein the receiving step is carried out with the user request including a database query.

5. The computer-implemented method of claim 4, wherein the disallowing access step includes steps of disallowing compilation and execution of the database query.

6. The computer-implemented method of claim 1, wherein the defining and generating steps are carried out with the grant and requirements data structures including a user identification field configured to store a bit value that uniquely identifies a user.

7. The computer-implemented method of claim 6, wherein the bit-wise comparison performing step includes a step of retrieving a grant data structure that includes a user identification field whose bit value matches the bit value of the user identification field in the generated requirements data structure.

8. The computer-implemented method of claim 1, wherein the bit-wise comparison performing step includes a step of disallowing execution of the received user request unless a grant binary number collectively formed by the bit values of the grant data structure elements is greater than a request binary number collectively formed by the bit values of the requirements data structure elements.

9. The computer-implemented method of claim 8, further including a step of determining which elements of the requirements data structure have bit values that are less than corresponding elements of the grant data structure.

10. The computer-implemented method of claim 9, wherein the bit-wise comparison performing step includes a step of carrying out an XOR operation on the bit values of the elements of the requirements data structure and bit values of corresponding elements of the grant data structure.

11. The computer-implemented method of claim 1, further including a logging step to log each instance of disallowed access to any data structure.

12. The computer-implemented method of claim 1, further including a step of generating a message to request greater authorization when access to the secured data resources is disallowed.

13. The computer-implemented method of claim 12, further including a step of updating a bit value of a selected element in the grant data structure when the message to request greater authorization is answered with a grant of greater authority relative to the selected element.

14. The computer-implemented method of claim 1, wherein the secured data resources include at least one of data structures and applications.

15. The computer-implemented method of claim 1, wherein the defining and storing steps are carried out by expressing the grant data structure in Directory Services Markup Language (DSML) form and by entering the grant data structure as user data in a digital certificate of the user.

16. A computer system including a database that stores a plurality of secured data resources to which user access is to be controlled, the computer system comprising:
at least one processor;
a plurality of processes spawned by said at least one processor, the processes including processing logic for:
inventorying the data resources whose access is to be controlled;
generating a requirements data structure that includes a first bit string including a first plurality of elements, each of which being mapped to a separate one of the inventoried data resources and being configured to store a requirement bit value;
setting, for each of the first plurality of elements, the requirement bit value according to an authorization level necessary to access the mapped data resource;
defining and storing, for each user to have access to any of the inventoried data resources, a grant data structure that includes a second bit string including a second plurality of elements, each of which being mapped to a separate one of the inventoried data resources and being configured to store a grant bit value;
setting, for each of the second plurality of elements, the grant bit value according to an authorization granted to the user to access the mapped data resource;
receiving a user request including a SQL query for access to at least one of the secured data resources;
performing a bit-wise comparison of the grant and requirements data structures and disallowing access by the received user request to any secured data resource that is mapped to any element of the requirement data structure whose requirement bit value is greater than the grant bit value of a corresponding element of the grant data structure.

17. The computer system of claim 16, wherein the logic for the bit-wise comparison performing step includes logic for truncating the grant and requirements data structures to include only elements mapped to inventoried data resources to which the user request requests access.

18. A machine-readable storage medium having data stored thereon representing sequences of instructions which, when executed by a computing device, causes the computing device to control user access to a plurality of secured data resources by carrying out steps including:
inventorying the data resources whose access is to be controlled;
generating a requirements data structure that includes a first bit string including a first plurality of elements, each of which being mapped to separate one of the inventoried data resources and being configured to store a requirement bit value;
setting, for each of the first plurality of elements, the requirement bit value according to an authorization level necessary to access the mapped data resource;
defining and storing, for each user to have access to any of the inventoried data resources, a grant data structure that includes a second bit string including a second plurality of elements, each of which being mapped to a separate one of the inventoried data resources and being configured to store a grant bit value;
setting, for each of the second plurality of elements, the grant bit value according to an authorization granted to the user to access the mapped data resource;
receiving a user request including a SQL query for access to at least one of the secured data resources;
performing a bit-wise comparison of the grant and requirements data structures and disallowing access by the received user request to any secured data resource that is mapped to any element of the requirement data structure whose requirement bit value is greater than the grant bit value of a corresponding element of the grant data structure.

19. A computer-implemented method for controlling user access to data resources of an enterprise, the method comprising the steps of:
inventorying data resources to be secured;
for each inventoried data resource, assigning a requirement bit value bat defines an authorization level that is required to access the data resource;
storing the requirement bit value for each inventoried data resource in requirements data structure;
for each user to have access to any of the inventoried data resources, defining a grant data structure that includes a grant bit value for each of the inventoried data resources, each grant bit value determining whether the user is allowed access to a corresponding secured data resource;
when a request including a SQL query for access to one of the inventoried data resources is received from a user, performing a bit-wise comparison of the requirements data structure and the user's grant data structure and allowing the request for access to execute only when the grant bit value for the data resource to which access is requested is at least as great as the corresponding requirement bit value.

20. The computer-implemented method of claim 19, further including a step of enabling selected users to define and assign delegated grant data structures to hierarchically lower users in the enterprise, the defined and assigned delegated grant data structures storing grant bit values that are no greater than the grant bit values of the grant data structure of the user that defined and assigned the delegated grant data structures.

21. The computer-implemented method of claim 20, wherein the enabling step is carried out such that each grant bit value of each user's grant data structure is no greater than corresponding grant bit values of grant data structures assigned to hierarchically higher users.

22. The computer-implemented method of claim 19, further including a step of granting a user's request for an increased authorization level to access a selected data resource and correspondingly increasing a grant bit value for the selected data resource in the grant data structure of the user having made the request.

23. The computer-implemented media of claim 19, further including a step of canceling a user's grant data structure when the user leaves the enterprise.

24. The computer-implemented method of claim 19, further including a step of initially defaulting the grant bit values of the grant data structure for each user to a lowest bit value that is indicative of a lowest possible authorization level.

25. The computer-implemented method of claim 19, further including a step of resetting the grant bit values of the grant data structure for each user to a bit value indicative of and appropriate to a new state of the user's status in the enterprise.

* * * * *

UNITED STATES PATENT AND TRADEMARK OFFICE
CERTIFICATE OF CORRECTION

| | | |
|---|---|---|
| PATENT NO. | : 7,483,896 B2 | Page 1 of 1 |
| APPLICATION NO. | : 11/145736 | |
| DATED | : January 27, 2009 | |
| INVENTOR(S) | : Johnson | |

It is certified that error appears in the above-identified patent and that said Letters Patent is hereby corrected as shown below:

On the Title Page on page 2, under "U.S. Patent Documents", line 2, delete "Lucovaky" and insert -- Lucovsky --, therefor.

On the Title Page on page 2, under "U.S. Patent Documents", line 4, delete "Hernendez" and insert -- Hernandez --, therefor.

In column 29, line 4, in Claim 23, delete "media" and insert -- method --, therefor.

Signed and Sealed this

Twenty-seventh Day of April, 2010

David J. Kappos
*Director of the United States Patent and Trademark Office*